(12) United States Patent
Heiberg et al.

(10) Patent No.: US 10,964,220 B2
(45) Date of Patent: Mar. 30, 2021

(54) METHODS AND APPARATUS FOR PROVIDING CONTINUOUS FLIGHT TRAJECTORIES FOR AIRCRAFT

(71) Applicant: The Boeing Company, Chicago, IL (US)

(72) Inventors: Christopher J. Heiberg, Sunset Beach, CA (US); Kelly Schofield, Lawndale, CA (US)

(73) Assignee: The Boeing Company, Chicago, IL (US)

( * ) Notice: Subject to any disclaimer, the term of this patent is extended or adjusted under 35 U.S.C. 154(b) by 269 days.

(21) Appl. No.: 16/128,430

(22) Filed: Sep. 11, 2018

(65) Prior Publication Data

US 2020/0082729 A1    Mar. 12, 2020

(51) Int. Cl.
*G08G 5/00* (2006.01)
*G05D 1/10* (2006.01)

(52) U.S. Cl.
CPC ........... *G08G 5/0039* (2013.01); *G05D 1/101* (2013.01); *G08G 5/0047* (2013.01)

(58) Field of Classification Search
CPC .. G08G 5/0039; G08G 5/0047; G08G 5/0013; G08G 5/0034; G08G 5/0021; G05D 1/101
See application file for complete search history.

(56) References Cited

U.S. PATENT DOCUMENTS

| | | | | |
|---|---|---|---|---|
| 6,522,958 B1 * | 2/2003 | Dwyer et al. | ........ | C08G 5/0021 701/3 |
| 7,089,091 B2 * | 8/2006 | Artini et al. | ......... | G08G 5/0039 701/3 |
| 8,014,907 B2 * | 9/2011 | Coulmeau | ............ | G08G 5/0039 701/3 |
| 8,234,068 B1 * | 7/2012 | Young et al. | ........ | G08G 5/0039 701/528 |
| 8,849,476 B2 * | 9/2014 | Coulmeau | ............ | G08G 5/0039 701/14 |
| 9,115,995 B1 | 8/2015 | Owen et al. | | |

(Continued)

FOREIGN PATENT DOCUMENTS

EP    1 598 641    11/2005

OTHER PUBLICATIONS

Extended European Search Report prepared by the European Patent Office in application No. EP 19 18 4843.1 dated Jan. 23, 2020.

*Primary Examiner* — Dale W Hilgendorf
(74) *Attorney, Agent, or Firm* — McDonnell Boehnen Hulbert & Berghoff LLP

(57) ABSTRACT

Apparatus and methods for controlling an aircraft are described. A computing device can receive a flight plan from an origin to a destination via waypoint(s) and can calculate a flight trajectory for the flight plan. While controlling the aircraft to fly along the flight trajectory, the computing device can receive inputs that change the flight plan resulting in trajectory recalculation. After determining that the inputs include the inputs to change the flight plan resulting in trajectory recalculation, the computing device can calculate a new flight trajectory for the new flight plan. After calculating the new flight trajectory, the computing device can switch from the flight trajectory to the new flight trajectory, where the aircraft maintains continuous flight along the flight trajectory during the switch.

20 Claims, 8 Drawing Sheets

(56) References Cited

U.S. PATENT DOCUMENTS

| | | | |
|---|---|---|---|
| 2007/0129857 A1* | 6/2007 | Fortier | G05G 5/0039 701/3 |
| 2009/0105943 A1* | 4/2009 | Ferro et al. | G08G 5/0034 701/533 |
| 2010/0168936 A1* | 7/2010 | Caillaud et al. | G08G 5/0039 701/3 |
| 2012/0215387 A1* | 8/2012 | Yadav et al. | G08G 5/0039 701/3 |
| 2013/0226373 A1* | 8/2013 | Bollapragada et al. | G08G 5/0039 701/3 |
| 2015/0204675 A1* | 7/2015 | Albert et al. | G08G 5/0039 701/400 |
| 2016/0093217 A1* | 3/2016 | Hale et al. | G08G 5/003 701/120 |
| 2016/0093218 A1* | 3/2016 | Hale et al. | G08G 5/003 701/120 |
| 2016/0093221 A1* | 3/2016 | Bailey et al. | G08G 5/0039 701/120 |
| 2018/0261104 A1* | 9/2018 | Jonak et al. | G08G 5/0039 |
| 2018/0357909 A1* | 12/2018 | Eyhorn | G08G 5/0039 |
| 2019/0311632 A1* | 10/2019 | Hochwarth et al. | G08G 5/0039 |

* cited by examiner

```
┌─────────────────────────────────────────────────────────────┐
│ 810 RECEIVE, AT A COMPUTING DEVICE, ONE OR MORE FIRST       │
│ FLIGHT-PLAN-RELATED INPUTS THAT INCLUDE A FIRST FLIGHT      │
│ PLAN TO FLY FROM AN ORIGIN TO A DESTINATION VIA ONE OR      │
│ MORE WAYPOINTS                                              │
└─────────────────────────────────────────────────────────────┘
                                │
                                ▼
┌─────────────────────────────────────────────────────────────┐
│ 820 CALCULATE A FIRST FLIGHT TRAJECTORY FOR THE FIRST       │
│ FLIGHT PLAN USING THE COMPUTING DEVICE                      │
└─────────────────────────────────────────────────────────────┘
                                │
                                ▼
┌─────────────────────────────────────────────────────────────┐
│ 830 WHILE CONTROLLING THE AIRCRAFT TO FLY ALONG THE         │
│ FIRST FLIGHT TRAJECTORY, THE COMPUTING DEVICE:              │
│ • RECEIVES ONE OR MORE SECOND FLIGHT-PLAN-RELATED           │
│   INPUTS THAT CHANGE THE FIRST FLIGHT PLAN TO A SECOND      │
│   FLIGHT PLAN                                               │
│ • DETERMINES WHETHER THE SECOND FLIGHT-PLAN-RELATED         │
│   INPUTS INCLUDE ONE OR MORE OF: AN INPUT TO CHANGE         │
│   THE ORIGIN, AN INPUT TO CHANGE THE DESTINATION, AN        │
│   INPUT TO ADD A WAYPOINT TO THE ONE OR MORE                │
│   WAYPOINTS, AND AN INPUT TO DELETE A WAYPOINT OF THE       │
│   ONE OR MORE WAYPOINTS, AND                                │
│ • AFTER DETERMINING THAT THE SECOND FLIGHT-PLAN-            │
│   RELATED INPUTS INCLUDE ONE OR MORE OF: AN INPUT TO        │
│   CHANGE THE ORIGIN, AN INPUT TO CHANGE THE                 │
│   DESTINATION, AN INPUT TO ADD A WAYPOINT TO THE ONE OR     │
│   MORE WAYPOINTS, AND AN INPUT TO DELETE A WAYPOINT OF      │
│   THE ONE OR MORE WAYPOINTS, CALCULATES A SECOND            │
│   FLIGHT TRAJECTORY FOR THE SECOND FLIGHT PLAN              │
└─────────────────────────────────────────────────────────────┘
                                │
                                ▼
┌─────────────────────────────────────────────────────────────┐
│ 840 AFTER THE COMPUTING DEVICE HAS CALCULATED THE           │
│ SECOND FLIGHT TRAJECTORY, PERFORM A SWITCH FROM             │
│ CONTROLLING THE AIRCRAFT TO FLY ALONG THE FIRST FLIGHT      │
│ TRAJECTORY TO CONTROLLING THE AIRCRAFT TO FLY ALONG         │
│ THE SECOND FLIGHT TRAJECTORY USING THE COMPUTING            │
│ DEVICE, WHERE THE AIRCRAFT MAINTAINS CONTINUOUS FLIGHT      │
│ ALONG THE FIRST FLIGHT TRAJECTORY DURING THE SWITCH         │
└─────────────────────────────────────────────────────────────┘
```

FIG. 8

METHODS AND APPARATUS FOR PROVIDING CONTINUOUS FLIGHT TRAJECTORIES FOR AIRCRAFT

FIELD

The present disclosure generally relates to vehicle and aircraft navigation, and more particularly to methods and apparatus related to controlling a vehicle by continuously providing guidance even when a designated route, such as indicated using a flight plan for an aircraft, changes during operation of the vehicle.

BACKGROUND

Guidance, navigation, and control systems for aircraft include avionics on the aircraft and associated support systems. The avionics on the aircraft can include an autopilot, perhaps as part of a flight management system. The autopilot can be used to control the aircraft without constant hands-on control by a human operator; e.g., an aircraft pilot or co-pilot. Autopilots do not replace human operators; rather, autopilots assist human operators in controlling the aircraft. In some cases, autopilots can enable human operators to focus on broader aspects of aircraft operations, such as monitoring weather and/or other aspects of the aircraft.

SUMMARY

In one example, a method to control an aircraft is provided. A computing device receives one or more first flight-plan-related inputs. The first flight-plan-related inputs include a first flight plan to fly from an origin to a destination via one or more waypoints. The computing device calculates a first flight trajectory for the first flight plan. While controlling the aircraft to fly along the first flight trajectory, the computing device: receives one or more second flight-plan-related inputs that change the first flight plan to a second flight plan; determines whether the second flight-plan-related inputs include one or more of: an input to change the origin, an input to change the destination, an input to add a waypoint to the one or more waypoints, and an input to delete a waypoint of the one or more waypoints; and after determining that the second flight-plan-related inputs include one or more of: an input to change the origin, an input to change the destination, an input to add a waypoint to the one or more waypoints, and an input to delete a waypoint of the one or more waypoints, calculates a second flight trajectory for the second flight plan. After the computing device has calculated the second flight trajectory, the computing device performs a switch from controlling the aircraft to fly along the first flight trajectory to controlling the aircraft to fly along the second flight trajectory, where the aircraft maintains continuous flight along the first flight trajectory during the switch.

In another example, a computing device is described. The computing device includes one or more processors and one or more non-transitory computer-readable media configured to store at least computer-readable instructions that, when executed by the one or more processors, cause the computing device to perform functions. The functions include: receiving one or more first flight-plan-related inputs that include a first flight plan to fly an aircraft from an origin to a destination via one or more waypoints; calculating a first flight trajectory for the first flight plan; while controlling the aircraft to fly along the first flight trajectory: receiving one or more second flight-plan-related inputs that change the first flight plan to a second flight plan; determining whether the second flight-plan-related inputs include one or more of: an input to change the origin, an input to change the destination, an input to add a waypoint to the one or more waypoints, and an input to delete a waypoint of the one or more waypoints; and after determining that the second flight-plan-related inputs include one or more of: an input to change the origin, an input to change the destination, an input to add a waypoint to the one or more waypoints, and an input to delete a waypoint of the one or more waypoints, calculating a second flight trajectory for the second flight plan; and after calculating the second flight trajectory, performing a switch from controlling the aircraft to fly along the first flight trajectory to controlling the aircraft to fly along the second flight trajectory, where the aircraft maintains continuous flight along the first flight trajectory during the switch.

In still another example, a non-transitory computer readable medium is described. The non-transitory computer readable medium has stored thereon computer-readable instructions, that when executed by one or more processors of a computing device associated with an aircraft, cause the computing device to perform functions. The functions include: receiving one or more first flight-plan-related inputs that include a first flight plan to fly from an origin to a destination via one or more waypoints; calculating a first flight trajectory for the first flight plan; while controlling the aircraft to fly along the first flight trajectory: receiving one or more second flight-plan-related inputs that change the first flight plan to a second flight plan; determining whether the second flight-plan-related inputs include one or more of: an input to change the origin, an input to change the destination, an input to add a waypoint to the one or more waypoints, and an input to delete a waypoint of the one or more waypoints; and after determining that the second flight-plan-related inputs include one or more of: an input to change the origin, an input to change the destination, an input to add a waypoint to the one or more waypoints, and an input to delete a waypoint of the one or more waypoints, calculating a second flight trajectory for the second flight plan; and after calculating the second flight trajectory, performing a switch from controlling the aircraft to fly along the first flight trajectory to controlling the aircraft to fly along the second flight trajectory, where the aircraft maintains continuous flight along the first flight trajectory during the switch.

The features, functions, and advantages that have been discussed can be achieved independently in various embodiments or may be combined in yet other embodiments further details of which can be seen with reference to the following description and drawings.

BRIEF DESCRIPTION OF THE FIGURES

FIG. 8 is a flowchart of a method for controlling an aircraft, according to an example embodiment.

DETAILED DESCRIPTION

Figure 1:
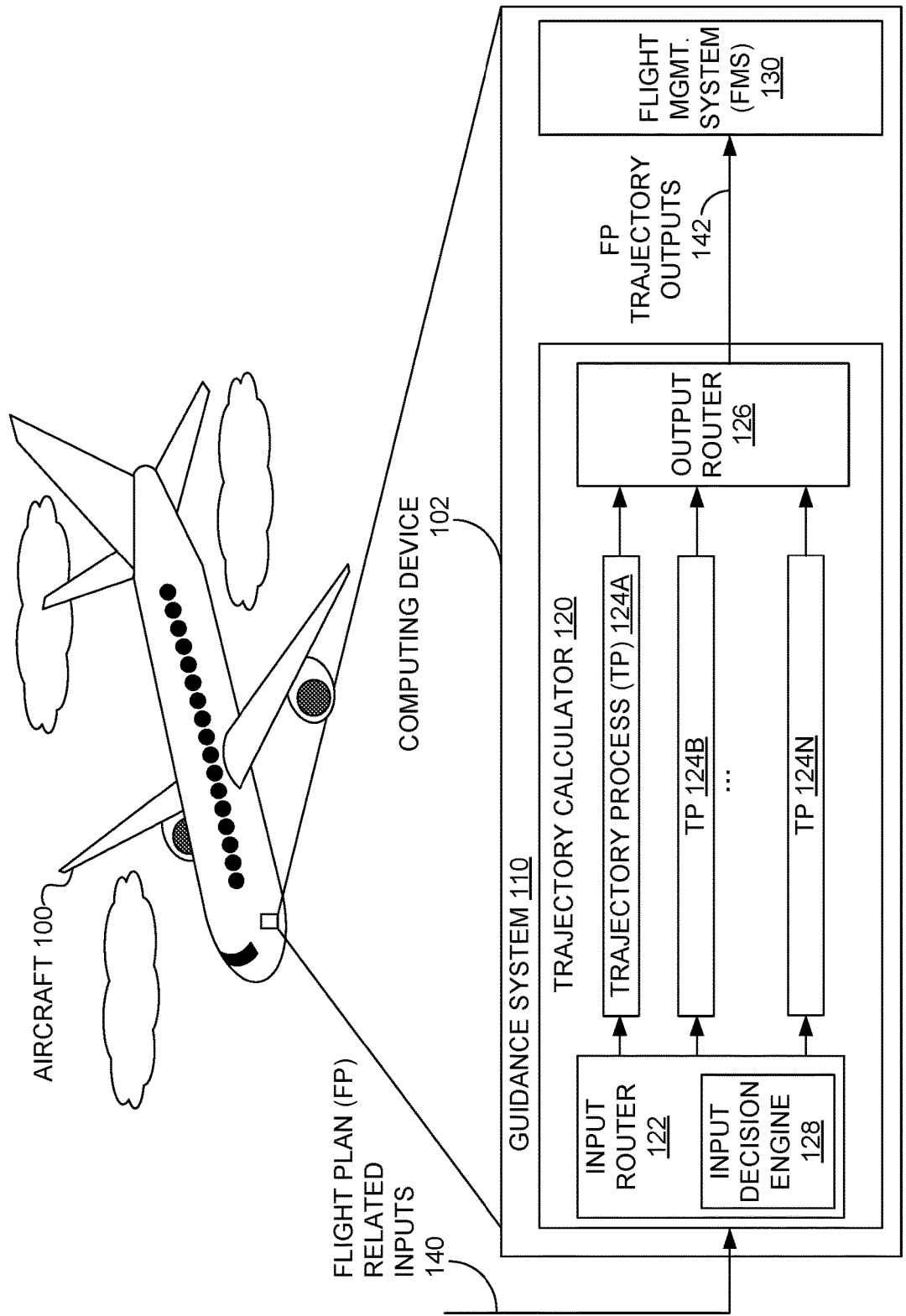
FIG. 1 is a diagram of an aircraft, according to an example embodiment.

Herein described are techniques, methods, and apparatus related to guiding an aircraft using an autopilot along a flight plan. In some examples, the herein-described techniques are applicable to other vehicles than aircraft that follow use automated techniques to follow a similar plan to a flight plan; e.g., an automated driver for a motor vehicle, an automated pilot of a boat, ship or other water-borne vehicle. Prior techniques process a mid-course change of the flight plan by recalculating the whole flight path, which can interrupt control of aircraft by a flight management system (FMS). Interrupting control of an aircraft by the flight management system can cause the aircraft to disengage the autopilot and possibly lead to unexpected course changes. In contrast to those prior techniques, the herein-described techniques provide continuous guidance to aircraft using autopilot and/or other autonomous flying systems by processing a mid-course change of a flight plan by calculating a remainder of a changed flight plan in parallel with providing aircraft controls from a current flight plan and switching from the current flight plan to the changed flight plan without interrupting control of the aircraft by the flight management system, thereby avoiding unexpected course changes due to processing mid-course changes.

The herein-described techniques can be performed by a computing device executing software to perform one or more functions of a trajectory calculator. The trajectory calculator can receive a flight plan for an aircraft, where the flight plan specifies that the aircraft is to fly or otherwise travel from a source location (or source, for short) to a destination location (or destination, for short) via one or more waypoints. In other examples, the trajectory calculator can receive a travel plan for a vehicle other than an aircraft, where the travel plan is similar to a flight plan by specifying that the vehicle is to travel from a source to a destination via one or more waypoints. Then, the trajectory calculator can calculate or "construct" a continuous, flyable trajectory from the flight plan and produce one or more outputs for controlling the aircraft to travel along the trajectory, e.g., using a flight management system that receives the outputs of the trajectory calculator.

In some cases, flight plans are subject to change; e.g., due to air traffic control instructions, changes in meteorological conditions, changes in aircraft weight data, and/or changes in aircraft velocity data. In some cases, flight plan changes involve a pilot or other aircraft personnel editing the flight plan. If the flight plan changes, the trajectory calculator can copy the original flight plan, make the changes to the copy of the flight plan, and calculate a new trajectory based on the changed flight plan. If the pilot decides to use the new trajectory, the trajectory calculator can change a state of the new trajectory from being in an inactive or standby state to an active state, where a trajectory in the inactive state cannot be used to control the aircraft, and where a trajectory in the active state can be used to control the aircraft.

Because the trajectory calculator calculates a trajectory based on an input flight plan, the trajectory calculator could restart trajectory calculation when a state of the flight plan changes. But, instead of starting over or copying the trajectory in the same manner as the flight plan, the herein-described techniques include remapping an edited (or standby) trajectory to a new output even though an input (as far as a flight management system is concerned) was changed. To remap trajectories, the trajectory calculator can simultaneously calculate multiple trajectories using multiple trajectory processes, track states of the flight plans and trajectories and, and determine when and how to properly remap trajectories by switching between trajectory processes.

The trajectory calculator can include an input router that assigns a flight plan to a trajectory process or "swim-lane" dedicated to the flight plan and directs (or routes) inputs associated with the flight plan to the trajectory process dedicated to the flight plan. The trajectory calculator can include an output router that can direct (or route) outputs of trajectory processes for use by downstream flight management systems (e.g., an auto-pilot system) and/or for use by a pilot, so that the downstream flight management systems and/or the pilot can fly the aircraft using the assigned trajectory. Each trajectory process can be launched and maintained in a continuous manner such that a calculated trajectory can be accessed for use in controlling the aircraft at any time (after the trajectory is calculated) without having to perform additional functions or to re-start a trajectory calculation when a change to use the previously-calculated trajectory is executed.

The input router can include an input decision engine to route inputs and/or otherwise direct trajectory processes and the output router can include a corresponding output decision engine to route outputs of trajectory processes. The input and output decision engines can each adhere to a respective set of rules that respectively assure that inputs for and outputs of each trajectory process are correctly routed; that is, inputs for a trajectory process TP_EXAMPLE specified by flight plan FP_EXAMPLE are routed to TP_EXAMPLE by the input decision engine and outputs of TP_EXAMPLE are routed as necessary to downstream systems (e.g., a flight management system, systems that provide feedback to a pilot) by the output decision engine.

The input decision engine can process information regarding changes in flight plans (including information regarding specification of new flight plans) to determine if or when a new trajectory process is to be assigned to calculate a trajectory for a flight plan, if or when a trajectory process is to be terminated and, if or when a trajectory process is to be assigned to a particular output. For example, the input decision engine can initialize routing of flight plans to trajectory processes by assigning flight plans to pre-selected trajectory processes. After initialization, this input decision engine can maintain assignment of flight plans to trajectory processes until a change in a flight plan is made that can cause reexamination of flight plan and/or trajectory process states. In some examples, a result of reexamination of flight plan and/or trajectory process states is calculation and/or recalculation of one or more trajectories.

In some examples, a change in a flight plan that causes reexamination of flight plan and/or trajectory process states can be based on the change itself. Such changes to flight plans that can cause reexamination flight plan and/or trajectory process states can include, but are not limited to, a change in an origin of a flight plan, a change in a destination of a flight plan, a change in an actual or estimated time related to a flight plan (e.g., a departure time, an arrival time, a time to reach a waypoint), and/or a change to a waypoint; e.g., addition of a waypoint, deletion of a waypoint, and/or a change of a location of a waypoint beyond a threshold distance. Other changes to flight plans that can cause reexamination of a flight plan and/or trajectory process states can include, but are not limited to, a change of meteorological condition data associated with a flight plan, a change of aircraft weight data, and/or a change of aircraft velocity data. In other examples, a change to flight plans that can cause reexamination of a flight plan and/or trajectory process states can be based on a reason for the change of the flight plan. Example reasons for a change of the flight plan that can cause reexamination of a flight plan and/or trajectory process states can include, but not limited to, a reason indicating that a flight plan was activated, a reason indicating that a flight plan was deactivated, a reason indicating that a flight plan was executed, a reason indicating that a flight plan was discarded, and a reason indicating that a flight plan was edited. Other changes to a flight plan that can cause reexamination of flight plan and/or trajectory process states are possible as well.

After a flight plan is routed to a trajectory process, the trajectory process calculates a trajectory for the flight plan, and any outputs of the trajectory process are passed through the output decision engine, which maps trajectory process output to any outputs associated with the flight plan. Each trajectory process can calculate a trajectory to multiple levels of completeness as determined through the input decision engine.

Completeness can refer to levels of precision, features or degree of optimization included in the profile construction. For example, a trajectory can be calculated as a lateral or "stick figure" trajectory or as a lateral and vertical predictive trajectory. A lateral trajectory for a flight plan can include a path from the source to the destination via the respective waypoints of the flight plan. In some examples, a lateral trajectory can be a stick figure trajectory that includes the path from the source to the destination via the respective waypoints of the flight plan but turn transitions are between the source, destination, and/or waypoints are not determined. A lateral and vertical predictive trajectory (or lateral and vertical trajectory, for short) can include the path from the source to the destination via the respective waypoints of the flight plan and altitude/vertical information for aircraft travel along the path. In some examples, a lateral and vertical trajectory can be considered to be more complete than a corresponding lateral trajectory, and a lateral trajectory with turn transitions can be considered to be more complete than a corresponding stick figure trajectory. Other types of trajectories and corresponding levels of completeness are possible as well.

As another example, a trajectory can be calculated within different thresholds of precision associated with different levels of completeness; e.g., a first path from the source to the destination via the respective waypoints of the flight plan can be determined within a first threshold or predetermined number of feet, miles, kilometers, or other unit of measure associated with a first level of completeness, and a second path from the source to the destination via the respective waypoints of the flight plan can be determined within a second threshold or predetermined number of feet, miles, kilometers, or other unit of measure associated with a second level of completeness, where the first threshold is greater than from the second threshold—thus, the second level of completeness can be considered to be more complete than the first level of completeness.

As another example, a threshold process can apply one or more optimization techniques to a calculated trajectory; e.g., a trajectory can have a first level of completeness representing a partially calculated trajectory, a second level of completeness representing a completely calculated trajectory without any optimization techniques applied, a third level of completeness representing a completely calculated trajectory with at least one optimization technique applied, a fourth level of completeness representing a completely calculated trajectory with at least two optimization techniques applied, etc.

The input router can be employed upon reception of an input that indicates one or more flight plans has been updated. If there is no change to a flight plan or its state, the input decision engine of the input router may not determine any changes in decision outcomes and so trajectory calculation can continue within each trajectory process. When there is a change to a flight plan or its state, the flight plan change is sent to the input decision engine, which can determine which trajectory process is assigned to a flight plan associated with the flight plan change. Based on the flight plan state, the flight plan change, and/or a reason for the flight plan change, the input decision engine can change the assignment of flight plans to trajectory processes. In some examples, the input decision engine can determine that the flight plan state, the flight plan change, and/or the reason for the flight plan change does not warrant changing the assignment of flight plans to trajectory processes and so can maintain the assignment.

As an example, when the input router and input decision engine are initialized, the input router and input decision engine can receive initial (perhaps empty) flight plans that are in INACTIVE states. Then, the input decision engine can assign the initial flight plans to initial trajectory processes. In some examples, the initial trajectory processes calculate corresponding stick-figure trajectories for the initial flight plans. After initialization, a flight plan remains with its corresponding trajectory process unless the input decision engine receives an input indicating there is a change to a flight plan—then, the input decision engine can change the assignment of flight plans to trajectory processes.

To make an in-course change to a flight plan, an original flight plan (typically an ACTIVE flight plan whose trajectory is being used to control the aircraft) is initially edited to create a new flight plan. An initial edit of an original flight plan can cause the trajectory calculator to assign a new flight plan (termed a MOD (for modified) flight plan) with a corresponding trajectory process. The trajectory process assigned to the MOD flight plan can process a flight trajectory for the new flight plan while, in parallel, a trajectory process assigned with an ACTIVE flight plan can process a flight trajectory for the original flight plan.

As part of being assigned to the MOD flight plan, the trajectory process assigned to the MOD flight plan can create the new flight plan as a copy of the original flight plan and can receive a copy of the trajectory used for the original flight plan, thus allowing the trajectory process for the MOD flight plan to save time during initial trajectory calculation. Further, creation of the MOD flight plan to edit a copy of the flight plan of an ACTIVE flight plan does not interrupt signals for the ACTIVE flight plan while the flight plan is edited, as the ACTIVE flight plan and corresponding original flight plan are unaffected by editing the new flight plan of the MOD flight plan.

Once the new flight plan is done being edited, the MOD flight plan can be activated for use in controlling the aircraft. The trajectory calculator allows only one ACTIVE flight plan at a time, so activating the MOD flight plan changes a state of the MOD flight plan to be ACTIVE, and changes a state of the previously-ACTIVE flight plan to be INACTIVE. As both the ACTIVE and MOD flight plans are processed in parallel, activating the MOD flight plan results in a substantially instantaneous switch of flight plans so that the output of the trajectory calculator for the ACTIVE flight plan is uninterrupted, even in cases where the entire original flight plan was edited extensively. For example, the switch of flight plans that occurs when a MOD flight plan is activated can occur within a threshold period of time, and so occurs substantially instantaneously; e.g., the threshold period of time can be 100 microseconds or less. As the output of the trajectory calculator for the ACTIVE flight plan is uninterrupted, the trajectory calculator can provide continuous outputs for controlling an aircraft even when flight plans change.

Implementations of this disclosure provide technological improvements that are particular to guidance systems, for example, guidance systems providing autopilot services for commercial, private, and military aircraft. The herein-described techniques can be used to produce continuous, flyable trajectories from flight plans that are subject to change. The herein-described techniques can be carried out by a trajectory calculator having a plurality of trajectory processes, each of which can be used to independently calculate a trajectory based on an input flight plan, where the trajectory calculator enables access to each calculated trajectory for aircraft control at any time without having to perform additional functions or re-start a trajectory calculation when a flight plan change is executed. Further, the trajectory calculator can enable switching between flight plans (and thereby switching between trajectories) without interrupting control of the aircraft, thereby providing for continuously-controlled flight before, during, and after such switches. Continuously-controlled flight increases aircraft flight reliability by avoiding unexpected interruptions (e.g., one or more "hiccups" in flight) due to flight plan changes—such unexpected interruptions can cause passenger and aircrew discomfort during flight.

Further, the trajectory calculator can compute multiple trajectories in parallel at one time, which can increase trajectory throughput of a guidance system with the trajectory calculator. Also, since the trajectory calculator can compute multiple trajectories at one time, the trajectory calculator increases guidance system flexibility by enabling selection and switching to one of the multiple computed trajectories for aircraft control as necessary by a pilot, aircrew, autopilot, and/or other aircraft control system. Additionally, while the herein-described techniques are described in the context of aircraft control, the herein-described techniques are applicable to control of other vehicles that utilize travel plans similar to flight plans; e.g., a truck, boat, or ship that follows a navigation plan from a source location to a destination location via one or more waypoints, perhaps under autonomous control.

FIG. 1 is a diagram of aircraft 100, according to an example embodiment. Aircraft 100 includes computing device 102, which in turn includes guidance system 110. Guidance system 110 is shown in FIG. 1 with trajectory calculator 120 and flight management system (FMS) 130.

Trajectory calculator 120 can include input router 122, trajectory processes (TPs) 124A, 124B . . . 124N, and output router 126, where input router 122 can in turn include input decision engine 128.

Computing device 102 can receive flight-plan-related inputs 140, which can include one or more inputs related to a flight plan for flying aircraft 100; e.g., an input specifying a new flight plan, an input specifying one or more changes to a flight plan, an input specifying activation and/or deactivation of a flight plan, an input adding, subtracting, and/or modifying data associated with a flight plan, an input discarding a flight plan, etc. Changes to a flight plan can include, but are not limited to, a change in an origin of a flight plan, a change in a destination of a flight plan, a change in an actual or estimated time related to a flight plan (e.g., a departure time, an arrival time, a time to reach a waypoint), and/or a change to a waypoint; e.g., addition of a waypoint, deletion of a waypoint, and/or a change of a location of a waypoint beyond a threshold distance. In some examples, a reason for a change to a flight plan is provided in flight-plan-related inputs 140; example reasons for changes to flight plans include, but are not limited to: a reason indicating that a flight plan was activated, a reason indicating that a flight plan was deactivated, a reason indicating that a flight plan was executed, a reason indicating that a flight plan was discarded, and a reason indicating that a flight plan was edited.

Data associated with a flight plan provided in flight-plan-related inputs 140 can include, but is not limited to, data about meteorological conditions related to the flight plan (e.g., wind speed data, wind direction data, temperature data, humidity data, barometric pressure data, precipitation data, weather prediction data), changes in data about aircraft 100 (e.g., weight data, fuel data, status information of equipment of aircraft 100), and changes in data related to a location, speed, velocity, and/or acceleration of aircraft 100. Flight-plan-related inputs 140 can also include information associated with a current flight plan; e.g., a current heading and/or speed, of aircraft 100, a change in route, a change in course, etc. Other flight-plan-related inputs 140 are possible as well.

Upon reception at computing device 102, flight-plan-related inputs 140 can be provided to trajectory calculator 120 of guidance system 110. Trajectory calculator 120 can process flight-plan-related inputs 140 to determine one or more trajectories. More specifically, input router 122 can receive flight-plan-related inputs 140 and can use input decision engine 128 to manage and/or provide inputs to each of trajectory processes 124A, 124B . . . 124N. For example, input decision engine 128 can assign a flight plan (FP) to a trajectory process so that the trajectory process can calculate one or more trajectories for the assigned flight plan. If a flight plan is changed, input decision engine 128 can receive an indication that a change to the flight plan has occurred, perhaps via flight-plan-related inputs 140, where the indication can include a change reason for changing the flight plan. Based on the change reason, input decision engine 128 can determine whether to continue to maintain an assignment of the changed flight plan to a trajectory process or to change an assignment of the changed flight plan to a different trajectory process. After determining to change the assignment of the changed flight plan to a different trajectory process, input decision engine 128 can communicate information about the changed assignment to input router 122 and/or output router 126. Input router 122 and output router 126 can respectively route inputs to and outputs from the newly-assigned trajectory process in accordance with the changed assignment.

Trajectory calculator 120 can use each of trajectory processes 124A, 124B . . . 124N to calculate a flight trajectory associated with a flight plan of the one or more flight plans specified in flight-plan-related inputs 140. As such, when trajectory calculator 120 has n trajectory processes (n>0), then trajectory calculator 120 can use the trajectory processes to calculate and maintain up to n different flight trajectories at one time. Outputs of trajectory processes 124A, 124B . . . 124N can be provided to output router 126 which can provide some or all of the outputs of trajectory processes 124A, 124B . . . 124N to flight management system 130 as flight plan trajectory outputs 142.

Flight management system 130 can automate one or more in-flight tasks for aircraft 100. In particular, flight management system 130 can take flight plan trajectory outputs 142 as inputs and use flight plan trajectory outputs 142 to control aircraft 100; that is, flight management system 130 can act as an autopilot for aircraft 100 to control aircraft 100; e.g., to travel along a trajectory specified using flight plan trajectory outputs 142.

Figure 2:
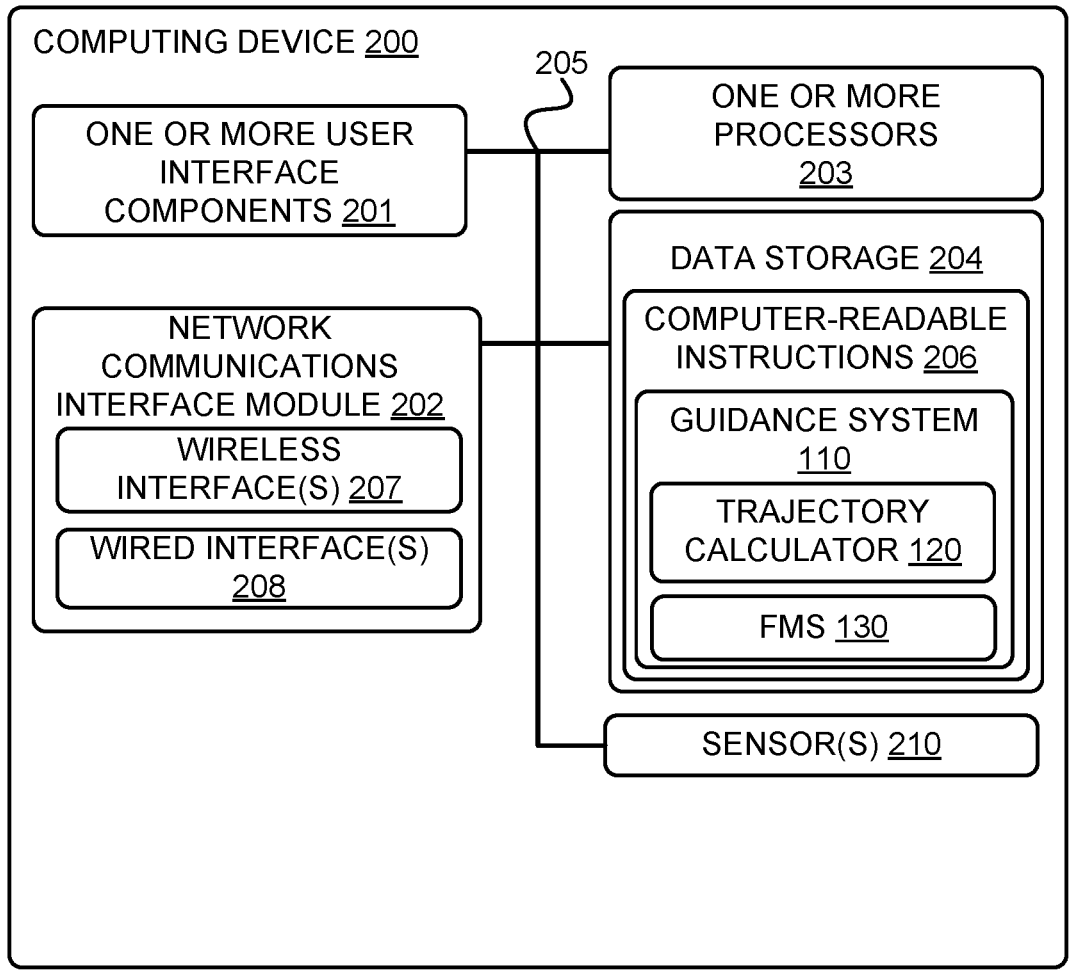
FIG. 2 is a block diagram of a computing device, according to an example embodiment.

FIG. 2 is a block diagram of computing device 200, according to an example embodiment. Computing device 200 includes one or more user interface components 201, network-communication interface module 202, one or more processors 203, data storage 204, and sensor(s) 210, all of which may be linked together via a system bus, network, or other connection mechanism 205, in accordance with an example embodiment. In particular, computing device 200 can perform some or all of the herein-described functionality related to one or more of: a guidance system, a trajectory calculator, an input decision engine, a flight management system, computing device 102, scenario 300, and/or methods 700, 800. In some examples, computing device 200 can be a mobile or non-mobile computing device, and can be embodied as one or more of: desktop computer, laptop or notebook computer, personal data assistant (PDA), mobile phone, smart phone, smart watch, embedded processor, and/or any similar device that is equipped with at least one processing unit capable of executing machine-language instructions that implement at least part of the herein-described techniques and methods. Other components shown in FIG. 2 can be varied from the illustrative examples shown. Generally, the different embodiments can be implemented using any hardware device or system capable of running program code.

User interface component(s) 201 can include one or more components that can receive input and/or provide output, perhaps to a user. User interface component(s) 201 can include one or more components configured to send and/or receive data to and/or from a user and/or other entities; such components can include but are not limited to: a keyboard, a keypad, a touch screen, a touch pad, a computer mouse, a track ball, a joystick, button and/or other similar devices configured to receive user input from a user of and/or other entities associated with the computing device 200. User interface component(s) 201 can include one or more components configured to display visual outputs (e.g., graphical, textual, and/or numerical information); such components can include but are not limited to: cathode ray tubes (CRTs), liquid crystal displays (LCDs), light emitting diodes (LEDs), displays using digital light processing (DLP) technology, printers, light bulbs, and/or other devices capable of displaying visual outputs. User interface component(s) 201 can also include one or more components to generate audible output(s); such components can include but are not limited to: a speaker, speaker jack, audio output port, audio output device, earphones, and/or other similar devices configured to generate audible output(s) and/or convey sound and/or audible information; e.g., to a user of computing device 200. In some examples, user interface component(s) 201 can also include one or more components to generate one or more haptic outputs.

Network-communication interface module 202 can be configured to send and receive data over one or more wireless interfaces 207 and/or one or more wired interfaces 208 via a data or other communications network. Wireless interface(s) 207, if present, can utilize an air interface, such as a Bluetooth®, ZigBee®, Wi-Fi™, and/or WiMAX™ interface to a data network, such as a wide area network (WAN), a local area network (LAN), one or more public data networks (e.g., the Internet), one or more private data networks, or any combination of public and private data networks. Wired interface(s) 208, if present, can comprise a wire, cable, fiber-optic link and/or similar physical connection to a data network, such as a WAN, a LAN, one or more public data networks, such as the Internet, one or more private data networks, or any combination of such networks.

In some examples, network-communication interface module 202 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), an Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

Processor(s) 203 includes one or more central processing units, computer processors, mobile processors, digital signal processors (DSPs), graphics processing units (GPUs), microprocessors, computer chips, programmable processors, multi-core processors, and/or other processing units configured to execute machine-language instructions and process data. Processor(s) 203 can be configured to execute computer-readable instructions 206 (e.g., program instructions) that are contained in data storage 204 and/or other instructions as described herein.

Data storage 204 includes one or more physical and/or non-transitory storage devices, such as read-only memory (ROM), random access memory (RAM), removable disk drives, hard drives, thumb drives, magnetic-tape memory, optical-disk memory, flash memory, volatile storage devices, non-volatile storage devices, and/or other storage devices. Generally, a storage device includes hardware that is capable of storing information; for example, data, computer-readable program instructions, and/or other suitable information on a temporary basis and/or a permanent basis. Data storage 204 can include one or more physical and/or non-transitory storage devices with at least enough combined storage capacity to contain computer-readable instructions 206 and any associated/related data structures. In some embodiments, some or all of data storage 204 can be removable, such as a removable hard drive, removable disk, or flash memory.

Computer-readable instructions 206 and any data structures contained in data storage 204 include computer-readable program instructions executable by processor(s) 203 and any storage required, respectively, to perform at least part of the herein-described functionality of a computing device. For example, data storage 204 can also store data used to perform at least part of the herein-described functionality of a computing device. Computer-readable instructions 206 can include instructions that when executed by processor(s) 203 to perform functions, including but not limited to herein-described functionality of software, displays, and/or user interfaces. For example, computer-readable instructions 206 can include instructions that when executed by processor(s) 203 to perform some or all of the herein-described functionality associated with guidance system 110, trajectory calculator 120, and/or flight management system 130.

In some embodiments, computing device 200 includes one or more sensors 210. Sensor(s) 210 can be configured to measure conditions in an environment around computing device 200 and provide data about the measured conditions of the environment. The data can include, but are not limited to: meteorological conditions including, but not limited to, wind speed, wind direction, temperature, humidity, barometric pressure, and/or rainfall; location data about computing device 200 including, but not limited to, latitude, longitude, and/or altitude data; kinematic information (e.g., location, speed, velocity, acceleration data) related to computing device 200, one or more vehicles, and/or one or more aircraft, and electromagnetic radiation data (e.g., infra-red, ultra-violet, X-ray data). The one or more sensors 210 can include, but are not limited to, one or more: Global Positioning System (GPS) sensors, location sensors, gyroscopes, accelerometers, magnetometers, video and/or still cameras, light sensors, infrared sensors, ultraviolet sensors, X-ray sensors, meteorological sensors, proximity sensors, vibration and/or motion sensors, heat sensors, thermometers, lasers, wind sensors, barometers, rain gauges, and microphones. In some examples, sensors 210 can be utilized for relative position sensing, where relative position sensing provides information about aircraft velocity relative to a vehicle; e.g., using differential GPS and/or radio-based triangulation methods. Other examples of sensor(s) 210 are possible as well.

Figure 3:
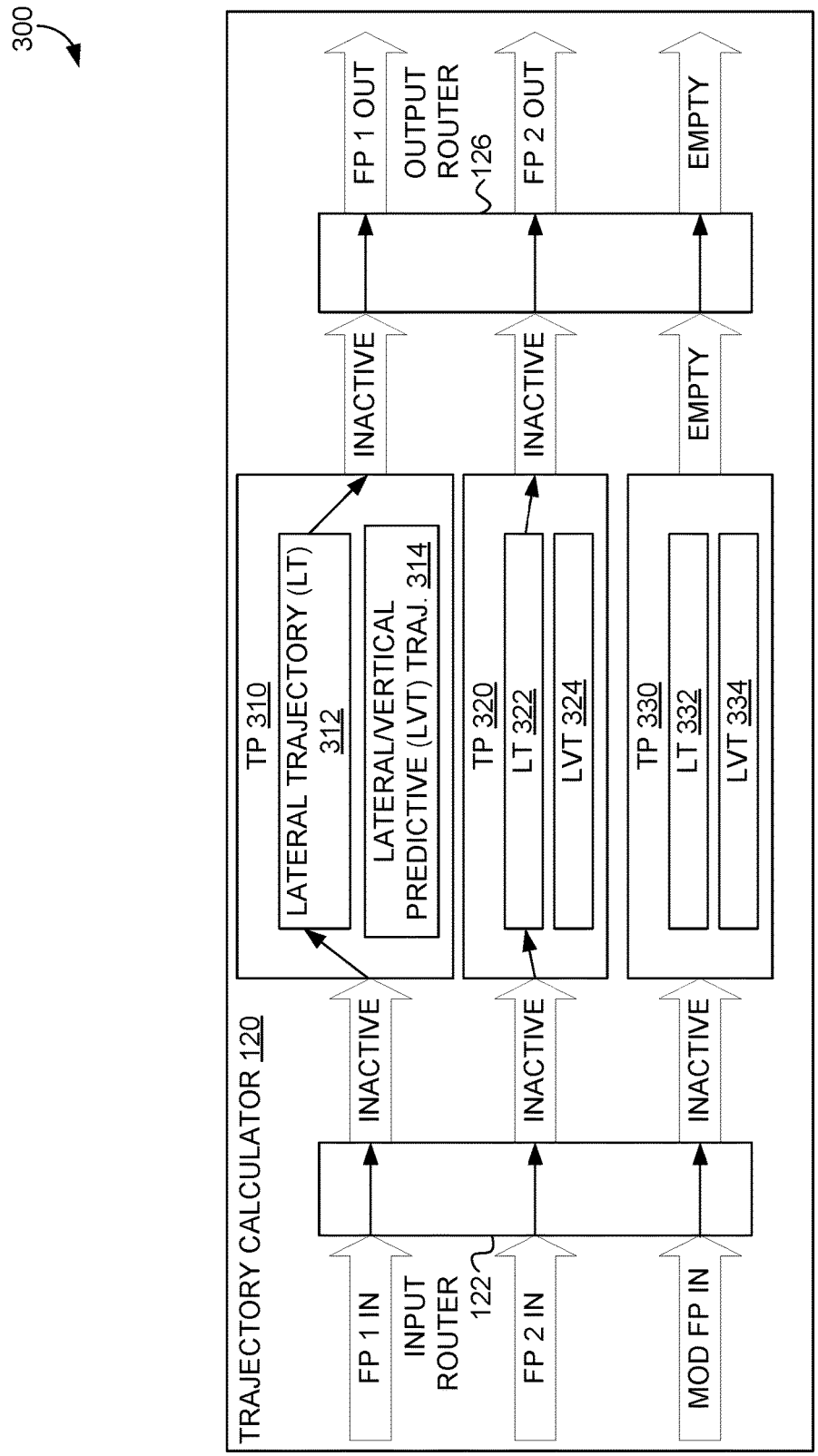
FIGS. 3, 4, and 5 illustrate a scenario where a trajectory calculator calculates flight trajectories for an aircraft, according to an example embodiment.
Figure 4:
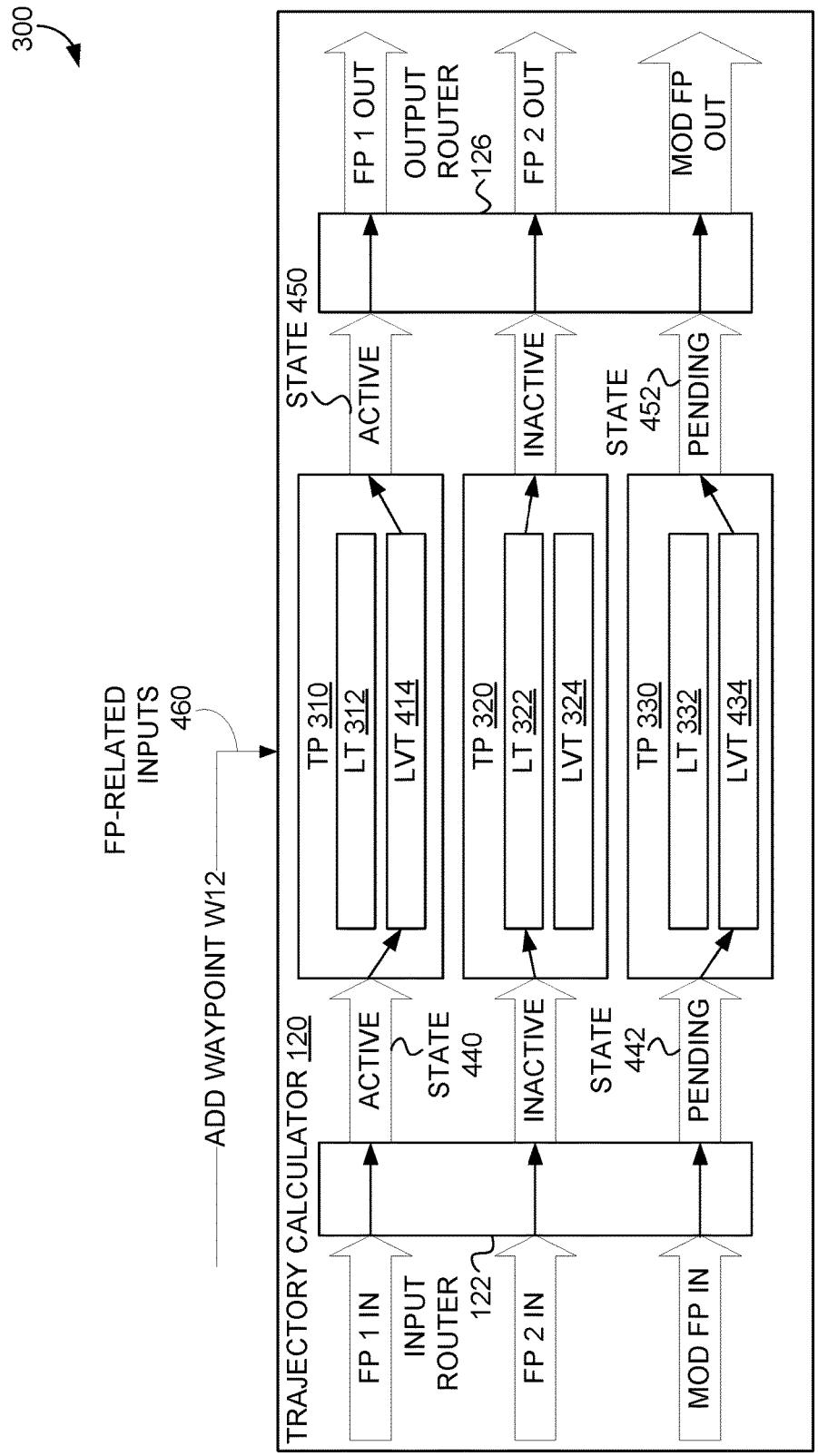
Figure 5:
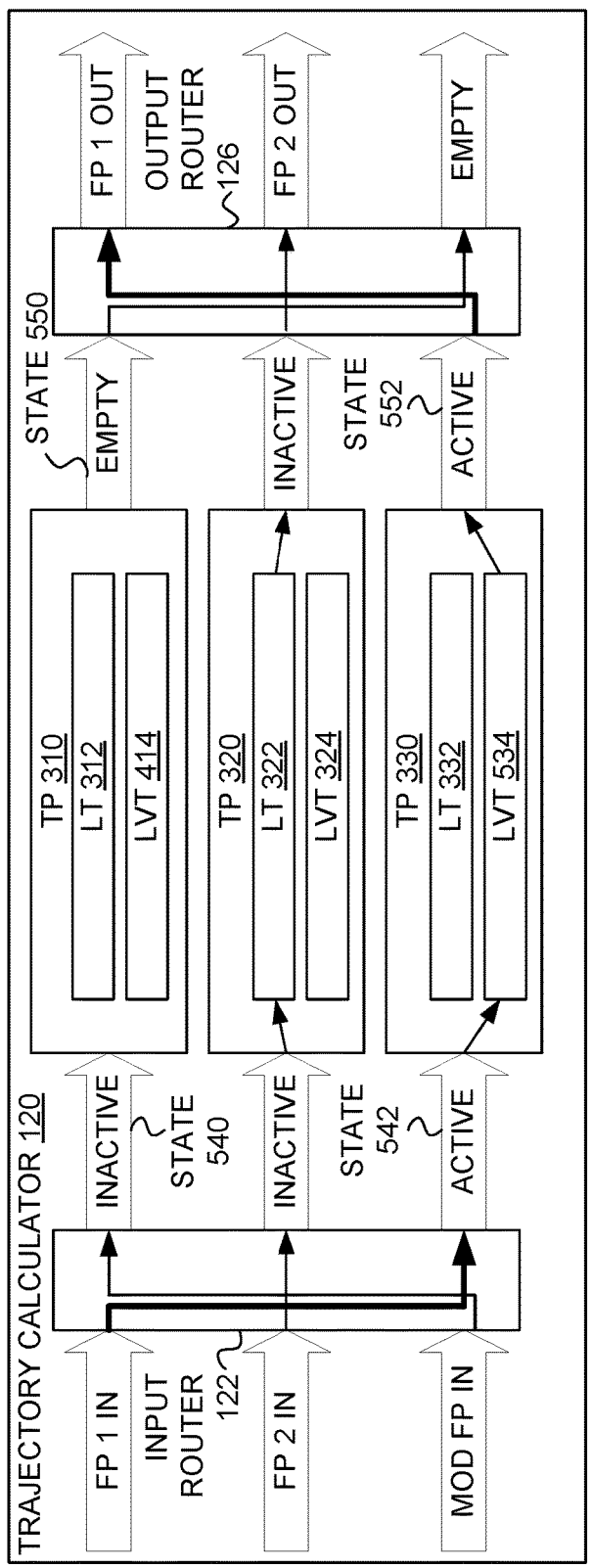

FIGS. 3, 4, and 5 illustrate scenario 300 where trajectory calculator 120 of computing device 102 calculates flight trajectories for aircraft 100, according to an example embodiment. At an onset of scenario 300, trajectory calculator 120 has three trajectory processes (TPs) 310, 320, 330 that are initialized to determine flight trajectories for three respective flight plans: FP 1, FP 2, and a MOD (modified) FP, where FP 1 represents a flow of information for a first flight plan, FP 2 represents a flow of information for a second flight plan, and MOD FP flow of information for a flight plan that is initially empty (that is, not representing an actual flight plan). Each of FP 1, FP 2, and MOD FP can be initialized to an INACTIVE state, where a flight plan in the INACTIVE state is not being used to control aircraft 100.

Scenario 300 continues with a pilot of aircraft 100 putting aircraft 100 on autopilot by activating FP 1 representing the first flight plan. FP 1 represents the first flight plan by providing a flow of information associated with the first flight plan, where the flow of information can include, but is not limited to, inputs related to the first flight plan and instructions/outputs to control an aircraft (such as aircraft 100) to fly (or otherwise travel; e.g., taxi) according to a flight trajectory calculated for the represented flight plan.

Activating FP 1 causes outputs of trajectory process 310 associated with FP 1/the first flight plan being used to control aircraft 100. Scenario 300 proceeds with a member of the aircrew of aircraft 100 editing the first flight plan, which includes copying the first flight plan to a new third flight plan and then changing the third flight plan. MOD FP is assigned to represent the third flight plan and a lateral and vertical trajectory for the third flight plan is calculated. After the lateral and vertical trajectory for the third flight plan is calculated, a member of the aircrew of aircraft 100 activates MOD FP. After MOD FP is activated, scenario 300 ends.

FIG. 3 shows trajectory calculator 120 at an onset of scenario 300. In scenario 300, trajectory calculator 120 supports three flows of information representing three flight plans—FP 1, FP 2, and MOD FP—using three trajectory processes 310, 320, 330. For example, at the onset of scenario 300, FP 1 represents a first flight plan determined by a member of the aircrew of aircraft 100, FP 2 represents a second flight plan determined by a member of the aircrew of aircraft 100, and MOD FP is empty and so does not represent an actual flight plan. In particular, each of FP 1, FP 2, and MOD FP includes information including a subset of flight-plan-related inputs 140 related to a respective represented flight plan, a flight trajectory for the represented flight plan calculated by an associated trajectory process, and outputs of the associated trajectory process that can be used by a pilot or an autopilot (e.g., of flight management system 130) to control aircraft 100 to fly according to the trajectory for the represented flight plan.

At the onset of scenario 300, trajectory processes 310, 320, 330 are respectively initialized to determine trajectories for three respective flight plans represented by FP 1, FP 2, and MOD FP, respectively. Each of trajectory processes 310, 320, 330 can determine one of two trajectories in scenario 300: a lateral trajectory or a lateral and vertical trajectory. For example, FIG. 3 shows that trajectory processes 310, 320, 330 can determine one of respective lateral trajectories (LTs) 312, 322, 332 and respective lateral and vertical trajectories (LVTs) 314, 324, 334.

For example, FIG. 3 shows that, at the onset of scenario 300, inputs for FP 1, FP 2, and the MOD FP are provided as respective "FP 1 IN", "FP 2 IN", and "MOD FP IN" to input router 122, passed through to respective trajectory processes 310, 320, 330, and corresponding outputs of respective trajectory processes 310, 320, 330 are passed through output router 126 as respective outputs "FP 1 OUT", "FP 1 OUT", and an "EMPTY" output (since MOD FP does not represent a flight plan at the onset of scenario 300). At the onset of scenario 300, FP 1 can provide FP 1 OUT outputs, which can be used to control aircraft 100 along the first flight plan. Similarly, at the onset of scenario 300, FP 2 can provide FP 2 OUT outputs, which can be used to control aircraft 100 along the second flight plan.

Each of trajectory processes 310, 320, 330 can calculate at least one of a lateral trajectory and a lateral and vertical trajectory for a flight plan. Also, inputs and outputs of each of trajectory processes 310, 320, 330 can be selectively directed through either the lateral trajectory or the lateral and vertical trajectory of the trajectory process. In other scenarios, some or all of trajectory processes 310, 320, 330 can calculate more, fewer, and/or different trajectories than lateral trajectories and lateral and vertical trajectories When inputs and outputs are routed through trajectory processes, the inputs and outputs can be routed through either a lateral trajectory, a lateral and vertical trajectory, or no flight trajectory at all (e.g., if the trajectory process is not associated with a flight plan). For example, FIG. 3 shows that, at the onset of scenario 300, inputs and outputs for trajectory process 310 are routed through lateral trajectory 312, inputs and outputs for trajectory process 320 are routed through lateral trajectory 322, and inputs and outputs for trajectory process 330 are not routed through a flight trajectory.

Throughout scenario 300, all of trajectory processes 310, 320, 330 can operate in parallel; that is, trajectory process 310 can receive first inputs, process the first inputs to generate a first flight trajectory according to a first flight plan, and generate first outputs related to controlling aircraft 100 along the first flight trajectory in parallel with trajectory process 320 receiving second inputs, processing the second inputs to generate a second flight trajectory according to a second flight plan, and generating second outputs related to controlling aircraft 100 along the second flight trajectory in parallel with trajectory process 330 receiving third inputs, processing the third inputs to generate a third flight trajectory according to a second flight plan, and generating third outputs related to controlling aircraft 100 along the third flight trajectory, where the first, second, and/or third inputs may differ, where the first, second, and/or third outputs may differ, and/or first, second, and/or third flight plans may differ. That is, trajectory processes 310, 320, 330 collectively can process up to three flight plans to calculate up to three flight trajectories and produce up to three different outputs, while trajectory processes 310, 320, 330 operate independently and in parallel.

Input router 122 can be used to route inputs designated to flight plans and corresponding trajectory processes. At the onset of scenario 300, input router 122 routes: designated FP 1 inputs/inputs for the first flight plan to trajectory process 310, designated FP 2 inputs/inputs for the second flight plan to trajectory process 320, and designated MOD FP inputs to trajectory process 330, as shown in FIG. 3 using arrows traversing input router 122.

Output router 126 can be used to route outputs of trajectory processes to designated flight plan outputs. At the onset of scenario 300, output router 126 routes: outputs of trajectory process 310 to designated FP 1 outputs/outputs for the first flight plan, outputs of trajectory process 320 to designated FP 2 outputs/outputs for the second flight plan, and outputs of trajectory process 330 to designated MOD FP outputs, as shown in FIG. 3 using arrows traversing output router 126. At the onset of scenario 300, MOD FP is empty, and so the designated MOD FP outputs are "EMPTY" as also shown in FIG. 3.

In scenario 300, each of FP 1, FP 2, and MOD FP can be in one of three states: INACTIVE, PENDING, or ACTIVE. An INACTIVE state indicates that a represented flight plan is not being used to control aircraft 100. A PENDING state indicates that a represented flight plan is ready, but not currently being used, to control aircraft 100. A flight plan can be put in the PENDING state if an INACTIVE flight plan is being activated or if an ACTIVE flight plan is being edited/used as a MOD flight plan. An ACTIVE state indicates that a represented flight plan is being used to control aircraft 100; e.g., either by a pilot or by flight management system 130. In scenario 300, a flight plan can become ACTIVE once selected for activation and/or execution by a member of the aircrew of aircraft 100. In scenario 300, when a flight plan is activated, the flight plan's state can change from INACTIVE to PENDING. When a flight plan is later executed, the flight plan's state can change from PENDING to ACTIVE. FIG. 3 shows that, at the onset of scenario 300, each of trajectory processes 310, 320, 330 are inactive.

In scenario 300, only one flight plan can be ACTIVE at a time. If a flight plan is ACTIVE and a different flight plan is then activated, the ACTIVE flight plan becomes INACTIVE, and the now-activated flight plan becomes the ACTIVE flight plan. When a flight plan is activated, inputs and outputs for a flow of information representing the flight plan remain routed through a previously-assigned trajectory process; e.g., if FP 2 were activated, inputs and outputs for FP 2 representing the second flight plan would remain routed by input router 122 and output router 126 through trajectory process 320.

In other scenarios, a flight plan can become active without specific user selection to activate the flight plan; for example, a flight plan can be edited as a MOD flight plan with an instruction to activate the MOD flight plan once a flight trajectory for the MOD flight plan has been calculated. As another example, aircraft 100 can be flown autonomously (e.g., as an unmanned aerial vehicle (UAV)) and a control program of aircraft 100 can select a flight plan for activation without user input. Other examples of activating (or deactivating) flight plans without specific user selection/input are possible as well.

Scenario 300 continues with a human pilot putting aircraft 100 on autopilot by activating the first flight plan, which is represented by FP 1. FIG. 4 shows trajectory calculator 120 after the first flight plan is activated, which is illustrated by states 440 and 450 of FP 1 both being "ACTIVE". ACTIVE FP 1 includes inputs received by input router 122 as FP 1 IN, trajectory process 310 that has calculated lateral trajectory 312 as well as lateral and vertical trajectory 414 based on the first flight plan. FIG. 4 utilizes arrows emanating outward from lateral and vertical trajectory 414 to indicate that outputs of lateral and vertical trajectory 414 are provided as FP 1 OUT using output router 126, where the FP 1 OUT outputs are used by the autopilot to control aircraft 100.

While FP 1 is an ACTIVE state, inputs provided via the FP 1 IN input may cause trajectory process 310 to modify an already calculated flight trajectory for the first flight plan/FP 1, which in turn may cause trajectory process 310 to provide additional and/or different FP 1 OUT outputs. And, while FP 1 is an ACTIVE state during scenario 300, outputs of trajectory process 310 provided as FP 1 OUT associated with the first flight plan/FP 1 are used to control aircraft 100. FIG. 4 shows that the already calculated flight trajectory for the first flight plan/FP 1 is lateral and vertical trajectory 414.

Scenario 300 proceeds with a member of the aircrew of aircraft 100 providing flight-plan-related inputs 460 (e.g., a change indication) related to editing the ACTIVE first flight plan to create a new flight plan. To begin editing the first flight plan, trajectory calculator 120 allocates MOD FP and trajectory process 330 to represent the edited flight plan, initializes trajectory process 330 by copying the first flight plan and related trajectory 414 from trajectory process 310 to trajectory process 330, and changes states 442 and 452 of MOD FP representing the new, third flight plan to be PENDING. MOD FP is put into a PENDING state as the third flight plan is a modified/edited version of the ACTIVE first flight plan. In scenario 300, flight-plan-related inputs 460 include editing instructions to add a waypoint "W12" to the third flight plan, where waypoint W12 was not present in the first flight plan.

Once the third flight plan is done being edited, trajectory process 330 then determines that waypoint W12 has been added to the third flight plan, and then calculates lateral and vertical trajectory 434 for the third flight plan based on the already-calculated lateral and vertical trajectory 414 for the first flight plan (which was provided during initialization of trajectory process 330 as part of MOD FP). Trajectory process 330 also routes inputs to lateral and vertical trajectory 434 and provides outputs from lateral and vertical trajectory 434 as shown using arrows in FIG. 4.

FIG. 4 also indicates that assigning trajectory process 330 to MOD FP that represents the third flight plan does not affect processing provided by either trajectory process 310 assigned to FP 1 representing the first flight plan or trajectory process 320 assigned to FP 2 representing associated the second flight plan. In particular, trajectory process 310 continues to provide outputs via FP 1 OUT to control aircraft 100 along lateral and vertical trajectory 414 for the first flight plan while trajectory process 330 is calculating lateral and vertical trajectory 434; i.e., uninterrupted/continuous control of aircraft 100 along the first flight plan is provided via outputs of trajectory process 310 along lateral and vertical trajectory 414 while the first flight plan was edited to create the third flight plan and while lateral and vertical trajectory 434 for the third flight plan was calculated.

Scenario 300 continues with trajectory process 330 completing calculation of lateral and vertical trajectory 434 and a member of the aircrew of aircraft 100 later activating MOD FP representing the third flight plan. Activating MOD FP causes trajectory calculator 120 to route inputs and outputs related to previously active FP 1 to the now active MOD FP, effectively switching aircraft control from a flow of instructions provided by FP 1 to a flow of instructions provided by MOD FP.

As shown in FIG. 5, after activation of MOD FP, FP 1 IN inputs are routed to lateral and vertical trajectory 534 of trajectory process 330 via input router 122. FIG. 5 also utilizes arrows emanating outward from lateral and vertical trajectory 534 to illustrate that, after activation of MOD FP, FP 1 OUT outputs are routed from lateral and vertical trajectory 534 of trajectory process 330 (assigned to MOD FP) via output router 126, where FP 1 IN and FP 1 OUT are in ACTIVE states as indicated by states 542 and 552. As also shown in FIG. 5, after activation of MOD FP, MOD FP IN inputs are routed to trajectory process 310 (assigned to FP 1) via input router 122 and trajectory process 310 outputs are routed as empty MOD FP OUT outputs via output router 126, where MOD FP IN and MOD FP OUT are in INACTIVE states as indicated by states 540 and 550.

From the autopilot's point of view, a flow of instructions associated for FP 1 have been continuously available via FP 1 OUT before, during, and after the switch from the first flight plan to the third flight plan. In particular, the autopilot received sufficient instructions via FP 1 OUT to maintain continuous flight along the first flight plan before, during, and after the switch from the first flight plan to the third flight plan, even while the instructions provided via FP 1 OUT were switched from being provided from trajectory process 310 assigned to FP 1 (representing the first flight plan) to being provided from trajectory process 330 assigned to MOD FP (representing the third flight plan). Thus, no discontinuity in instructions was introduced by the switch from FP 1/the first flight plan to MOD FP/the third flight plan, allowing the autopilot to fly without disruption. Then, after the switch from FP 1 to MOD FP, the autopilot continues to receive controls from FP 1 OUT and so maintains continuous flight along the third flight plan.

In scenario 300, activating MOD FP does not affect FP 2—as shown in FIGS. 4 and 5, inputs for INACTIVE FP 2 are provided to lateral trajectory 322 of trajectory process 320 as FP 2 IN and outputs of lateral trajectory 322 of trajectory process 320 are provided as FP 2 OUT both before and after the MOD FP was activated. After the MOD FP is activated, scenario 300 can be completed.

Figure 6:
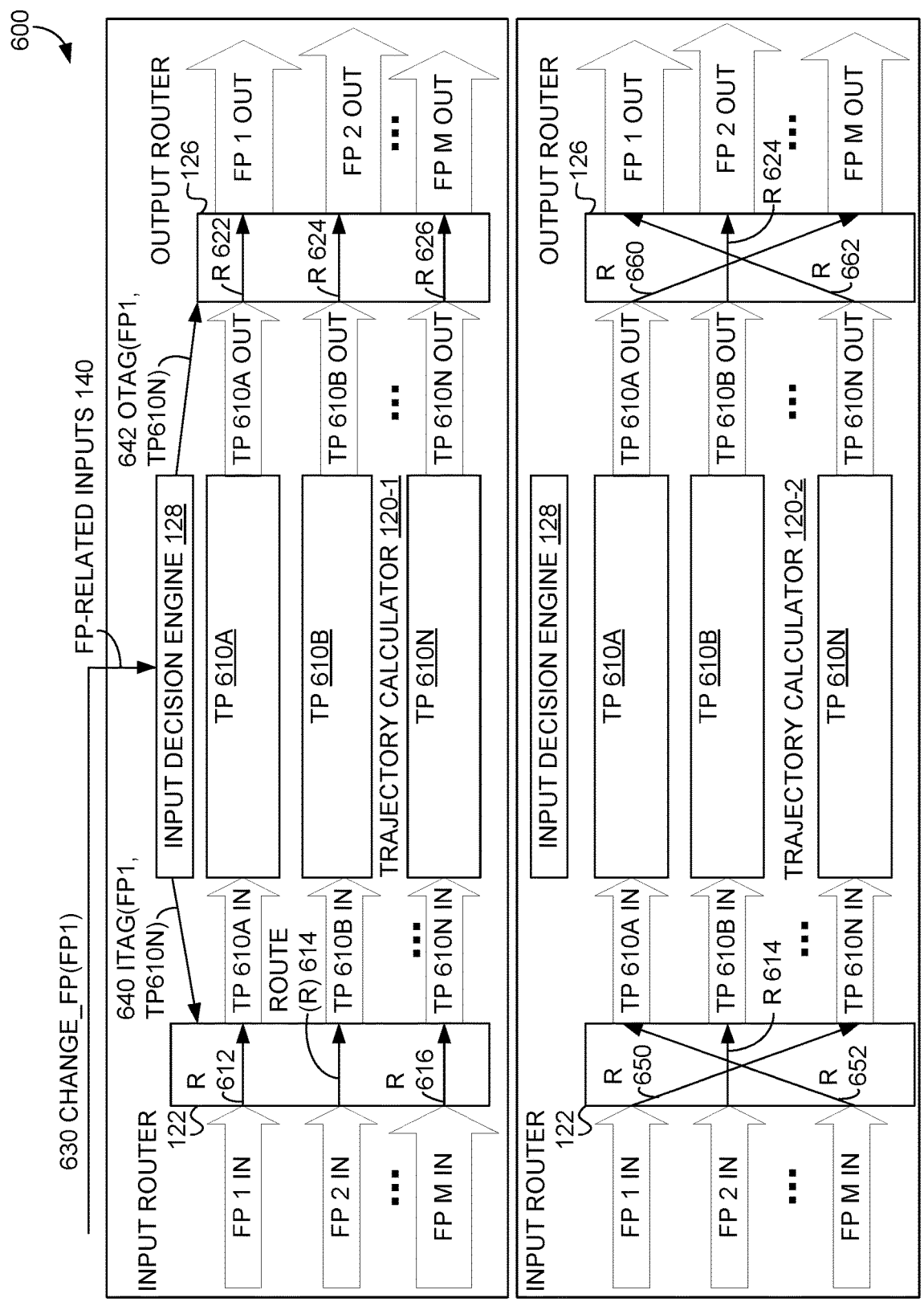
FIG. 6 illustrates a scenario where a trajectory calculator routes inputs and outputs for flight trajectories for an aircraft, according to an example embodiment.

FIG. 6 illustrates scenario 600 where trajectory calculator 120 routes inputs and outputs for flight trajectories for an aircraft, according to an example embodiment. Trajectory calculator 120 can use input decision engine 128 (which is part of input router 122, but shown outside of input router 122 in FIG. 6 for clarity's sake) in processing flight plans. If a change is detected in a flight plan, the flight plan change can be received as an input by input decision engine 128 and input decision engine 128 responsively can assign trajectory processes to flight plans as necessary to maintain continuous trajectory processes for each flight plan.

In some examples, input decision engine 128 can communicate by producing and sending "tags" and signals. A tag can convey information for aligning trajectory processes, flight plans, and flows of information within trajectory calculator 120. Input decision engine 128 can also communicate using signals related to changes in that include, but are not limited to, a signal indicating that a flight plan change has occurred that causes a change in one or more trajectory processes and a signal that a trajectory process is to be initiated, terminated, or modified in some way. In some examples, functionality of tags can be performed by signals and vice versa.

Scenario 600 illustrates use of tags by input decision engine 128. As shown in an upper portion of FIG. 6, at the onset of scenario 600, trajectory calculator 120 (illustrated as trajectory calculator 120-1 in the upper portion of FIG. 6) has N>2 trajectory processes 610A, 610B . . . 610N that can be assigned to M>2 flight plans FP 1, FP 2 . . . FP M. In scenario 600, respective FP 1, FP 2, and FP M inputs are routed by input router 122 to respective trajectory processes 610A, 610B, 610N via respective routes (Rs) 612, 614, 616. And respective outputs from respective trajectory processes 610A, 610B, 610N are routed during scenario 600 to respective FP 1, FP 2, and FP M outputs by output router 126 via respective routes 622, 624, 626.

Scenario 600 continues with input decision engine 128 receiving flight-plan-related inputs 140, where flight-plan-related inputs 140 include change flight plan message 630 having parameter "FP1" to indicate that change flight plan message 630 indicates a change for the flow of instructions associated with FP 1. After receiving change flight plan message 630, input decision engine 128 examines contents of change flight plan message 630 and determines that trajectory process 610N should be assigned to FP 1, which will also involve reassigning trajectory process 610A to another FP. In scenario 600, trajectory process 610A is reassigned from FP 1 to FP M. Subsequently, input decision engine 128 sends tags ITag 640 and OTag 642 to input router 122 and output router 126, respectively. Each of ITag 640 and OTag 642 has two parameters: "FP1" indicating a change related to FP 1, and "TP610N" indicating that trajectory process 610N should be assigned to FP 1 indicated by the "FP1" parameter. Each of ITag 640 and OTag 642 implicitly signals that the assignments of trajectory processes 610A and 610N to flight plans/flows of information are to be swapped as no specific assignment for trajectory process 610A (currently assigned to FP 1) was provided in tags 640, 642. In some scenarios, ITag 640 and/or OTag 642 are sent while carrying out a method, such as method 700, which is discussed herein in the context of at least FIG. 7.

As shown in a lower portion of FIG. 6, scenario 600 proceeds with input router 122 of trajectory calculator 120 (illustrated as trajectory calculator 120-2 in the lower portion of FIG. 6) responding to ITag 640 by re-routing (or changing) route 612 to be route 650. Route 650 maps FP 1 IN to TP 610N IN for trajectory process 610N and by re-routing (or changing) route 616 to be route 652, which maps FP M IN to TP 610A IN for trajectory process 610A. Also, output router 126 responding to OTag 642 by re-routing (or changing) route 622 to be route 660, which maps TP 610A OUT outputs of trajectory process 610A to FP M OUT and by re-routing (or changing) route 626 to be route 662, which maps outputs TP 610N OUT of trajectory process 610N to FP 1 OUT. Together, the re-routing operations performed in scenario 600 by input router 122 and output router 126 re-assign trajectory process 610A from FP 1 to FP M and re-assign trajectory process 610N from FP M to FP 1. After the re-routing operations are performed, scenario 600 can be completed.

In other scenarios, input decision engine 128 can send additional tags to ITag 640 and OTag 642 to signal changes in states of FP 1 and FP M that are related to the swapping of the assignments of trajectory processes 610A and 610N. For example, these additional tags can include (1) one or more tags destined for input router 122 other than ITag 640 to indicate that FP 1, trajectory process 610A, and/or a flight plan represented by FP 1 are now INACTIVE and/or to indicate that FP M, trajectory process 610N, and/or a flight plan represented by FP M are now ACTIVE and (2) one or more tags destined for output router 126 other than OTag 642 to indicate that FP 1, trajectory process 610A, and/or a flight plan represented by FP 1 are now INACTIVE and/or to indicate that FP M, trajectory process 610N, and/or a flight plan represented by FP M are now ACTIVE. After the additional tags are sent by input decision engine 128, output router 126 can provide one or more flight trajectory outputs of the trajectory process 610N for controlling the aircraft to a flight management system; e.g., flight management system 130. Other tags are possible as well.

Figure 7:
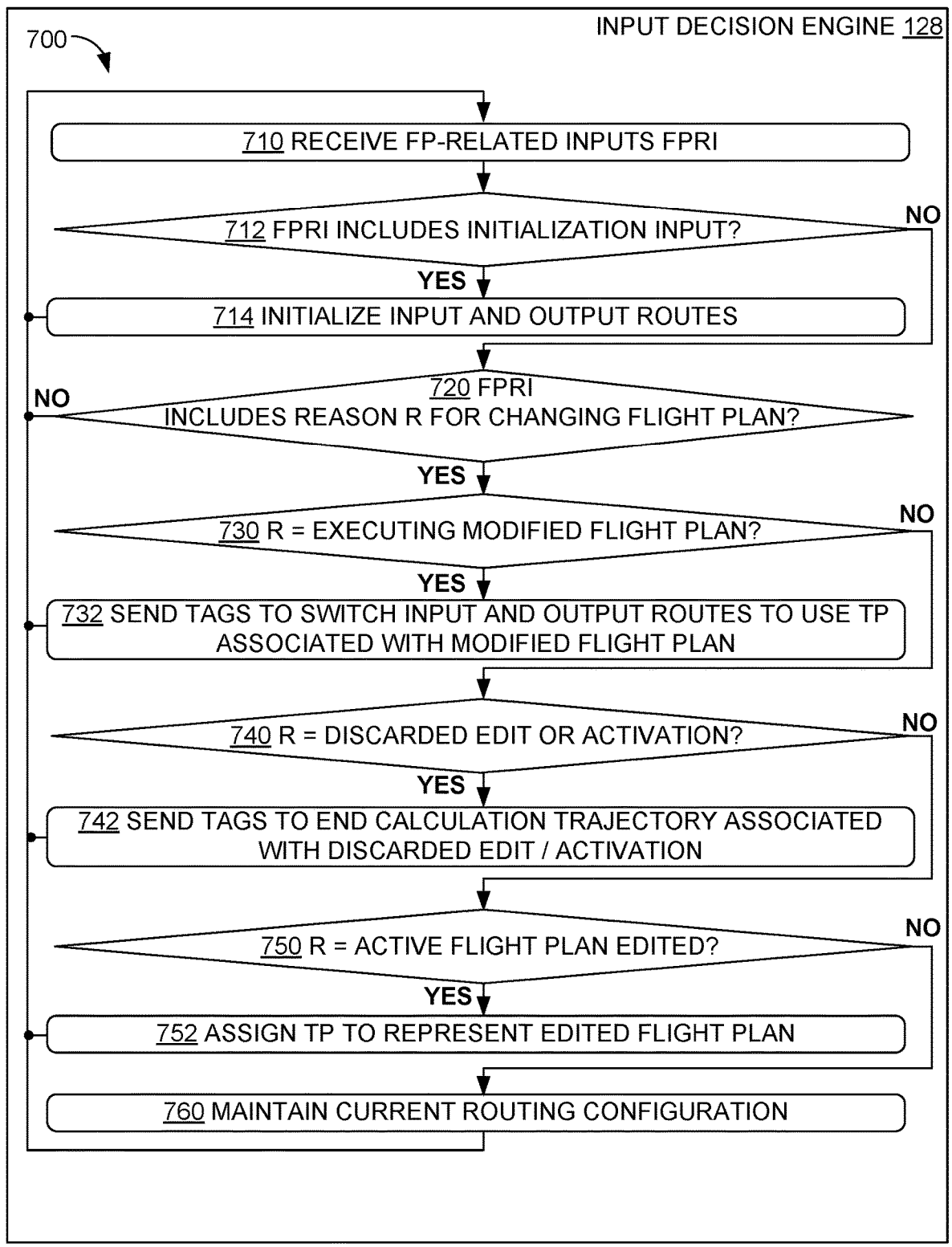
FIG. 7 is a flowchart of a method for determining routing configurations based on reasons for changing flight plans, according to an example embodiment.

FIG. 7 is a flowchart of method 700 for determining routing configurations based on reasons for changing flight plans, according to an example embodiment. Method 700 can be performed by a computing device acting as a herein-described input decision engine of a herein-described trajectory calculator; e.g., input decision engine 128.

Method 700 can begin at block 710. At block 710, the input decision engine can receive one or more flight-plan-related inputs; e.g., flight-plan-related inputs 140, as input FPRI. In other examples, the input decision engine can retrieve data related to the flight-plan-related inputs as input FPRI; e.g., from a buffer or other storage.

In some examples, method 700 can end at block 710. For example, if input FPRI indicates that the input decision engine should stop execution; e.g., as part of a power-up or other system initialization, then the input decision engine can responsively stop execution and method 700 could end. As another example, if the input decision engine determines that input FPRI has been fully processed, method 700 can end rather than await reception of additional input as input FPRI. Other reasons and/or examples for causing method 700 to end; e.g., at block 710 are possible as well.

At block 712, the input decision engine can determine whether input FPRI includes an initialization input requesting initialization of routing inputs and outputs for trajectory processes. If input FPRI includes an initialization input, the input decision engine can proceed to block 714. Otherwise, the input decision engine can determine that the input FPRI does not include an initialization input and can proceed to block 720.

At block 714, the input decision engine can initialize routing inputs and outputs. In some examples, input FPRI identifies particular flows of information and/or trajectory processes of the trajectory calculator to be initialized; in other examples, input FPRI does not identify particular flows of information and/or trajectory processes to be initialized—by default, initialization of routing inputs and outputs involves initialization of all routing inputs and outputs for the trajectory calculator. To initialize routing inputs, the input decision engine can direct an input router of the trajectory calculator to route inputs related to an uninitialized flow of information to a trajectory process assigned to the flow of information, such as discussed above in the context of at least FIGS. 3-6. To initialize routing outputs, the input decision engine can direct an output router of the trajectory calculator to route outputs from a trajectory process assigned to an uninitialized flow of information to the uninitialized flow of information, such as discussed above in the context of at least FIGS. 3-6. Also, the input decision engine can direct an uninitialized trajectory process to route inputs and/or outputs to a particular trajectory of the uninitialized trajectory process; e.g., a lateral trajectory or a lateral and vertical trajectory, such as discussed above in the context of at least FIGS. 3-6. Upon completion of the procedures of block 714, the input decision engine can proceed to block 710.

At block 720, the input decision engine can determine whether input FPRI includes a reason R for changing a flight plan. If the input decision engine determines that input FPRI includes a reason R for changing a flight plan, the input decision engine can proceed to block 730. Otherwise, the input decision engine can determine that input FPRI does not include a reason R for changing a flight plan and can proceed to block 710.

At block 730, the input decision engine can determine whether the reason R is a reason that the flight plan has been executed as a modified flight plan. For example, reception of a reason that the flight plan has been executed as a modified flight plan can indicate that a MOD FP has changed state to be an ACTIVE FP and that the previously ACTIVE FP has been discarded and/or changed state to be an INACTIVE FP. If the input decision engine determines that the reason R is a reason that the flight plan has been executed as a modified flight plan, then the input decision engine can proceed to block 732. Otherwise, the input decision engine determines that the reason R is not a reason that the flight plan has been executed as a modified flight plan, and can proceed to block 740.

At block 732, the input decision engine can send one or more tags to switch routing for both inputs and outputs for a flow of information, so that the flow of information uses the trajectory process associated with the modified flight plan. For example, scenario 600 discussed above in the context of at least FIG. 6 illustrates how the input decision engine can sent input and output tags (e.g., ITag 640 and OTag 642) to switch routing for both inputs and outputs for a flow of information (e.g., FP 1). Upon completion of the procedures of block 732, the input decision engine can proceed to block 710.

At block 740, the input decision engine can determine whether the reason R is either a reason that an edit of the flight plan was discarded or a reason that a previously activated flight plan was discarded. For example, reception of a reason that an edit of the flight plan was discarded can indicate that a modified flight plan that was being edited was discarded instead of continuing to be edited and/or becoming activated, which can cause termination of trajectory calculation by a trajectory process associated with the now-discarded flight plan. As another example, reception of a reason that a previously activated flight plan was discarded can indicate that an activated flight plan was discarded instead of executed, which can cause termination of trajectory calculation by a trajectory process associated with the now-discarded flight plan.

If the input decision engine determines that the reason R is either a reason that an edit of the flight plan was discarded or a reason that a previously activated flight plan was discarded, then the input decision engine can proceed to block 742. Otherwise, the input decision engine can determines that the reason R is not a reason that an edit of the flight plan was discarded and that the reason R is not a reason that a previously activated flight plan was discarded, and can proceed to block 750.

At block 742, the input decision engine can send one or more tags to a trajectory process associated with a MOD FP whose edit of the flight plan was discarded and/or a trajectory process whose previously activated flight plan was discarded to end calculation of a flight trajectory, since the trajectory is associated with a discarded edit or a discarded flight plan. Upon completion of the procedures of block 742, the input decision engine can proceed to block 710.

At block 750, the input decision engine can determine whether the reason R is a reason that editing of an ACTIVE flight plan was initiated. For example, reception of a reason that editing of an ACTIVE flight plan was initiated can indicate reception of: an input to change an origin of the flight plan, an input to change a destination of the flight plan, an input to add a waypoint to the flight plan, an input to change a waypoint of the flight plan, an input to change a runway of the flight plan, and/or an input to delete a waypoint of the flight plan was received as an edit of the flight plan. As another example, reception of a reason that editing of a flight plan was initiated can indicate reception of: an input to change meteorological condition data of the flight plan, an input to change aircraft weight data of the flight plan, an input to change a procedure associated with the flight plan, and/or an input to change aircraft velocity data of the flight plan. In other examples, the reason that editing of an ACTIVE flight plan was initiated can indicate reception of different inputs than discussed above. If the input decision engine determines that the reason R is a reason that editing of an ACTIVE flight plan was initiated, the input decision engine can proceed to block 752. Otherwise, the input decision engine can determine that the reason R is not a reason that editing of an ACTIVE flight plan was initiated, and the input decision engine can proceed to block 760.

At block 752, the input decision engine can, in response to determining that editing of an ACTIVE flight plan was initiated, assign an FP flow of information (e.g., FP 1, FP 2, or FP MOD of scenario 300) to represent a new flight plan created by editing the ACTIVE flight plan. To assign an FP flow of information, the input decision engine can copy the ACTIVE flight plan and a related flight trajectory from a trajectory process assigned to the ACTIVE flight plan being edited to a new trajectory process (e.g., one assigned to an INACTIVE FP flow of information) and can process the new flight plan using the new trajectory process, such as discussed above at least in the context of scenario 300 and FIGS. 3, 4, and 5.

At block 760, the input decision engine can determine that reason R does not relate to changing a current routing configuration of routes controlled by the input decision engine and so can maintain the current routing configuration. Examples of reason R that do not relate to changing the current routing configuration include, but are not limited to: a synchronization reason indicating route contents have not changed and routes are already synchronized; an activation reason indicating that an INACTIVE flight plan has been activated to a PENDING state; an executed activation reason indicating a PENDING flight plan has been activated to an ACTIVE state; a deactivation reason that a previously ACTIVE flight plan has become INACTIVE (e.g., due to another flight plan being executed). In other examples, input FPRI and/or reason R can include more and/or different inputs and/or can indicate more and/or different reasons for changes in flight plans than discussed herein.

FIG. 8 is a flowchart of a method for controlling an aircraft, according to an example embodiment. Method 800 is executable by a computing device, such as computing device 200 described in the context of FIG. 2.

Method 800 can begin at block 810. At block 810, the computing device can receive one or more first flight-plan-related inputs that include a first flight plan to fly from an origin to a destination via one or more waypoints, such as discussed herein in the context at least of FIGS. 1, 3, 4, 5, 6, and 7. In some examples, the first flight trajectory can include a lateral trajectory or a lateral and vertical trajectory, such as discussed herein in the context at least of FIGS. 3, 4, and 5.

At block 820, the computing device can calculate a first flight trajectory for the first flight plan using the computing device, such as discussed herein in the context at least of FIGS. 1, 3, 4, 5, 6, and 7.

At block 830, the computing device can, while controlling the aircraft to fly along the first flight trajectory: receive one or more second flight-plan-related inputs that change the first flight plan to a second flight plan; determining whether the second flight-plan-related inputs include one or more of: an input to change the origin, an input to change the destination, an input to add a waypoint to the one or more waypoints, and an input to delete a waypoint of the one or more waypoints; and after determining that the second flight-plan-related inputs include one or more of: an input to change the origin, an input to change the destination, an input to add a waypoint to the one or more waypoints, and an input to delete a waypoint of the one or more waypoints, calculating a second flight trajectory for the second flight plan, such as discussed herein in the context of FIGS. 3, 4, 5, and 7.

At block 840, after calculating the second flight trajectory, the computing device can perform a switch from controlling the aircraft to fly along the first flight trajectory to controlling the aircraft to fly along the second flight trajectory using the computing device, where the aircraft maintains continuous flight along the first flight trajectory during the switch, such as discussed herein in the context at least of FIGS. 3, 4, and 5.

In some examples, the computing device can include a trajectory calculator having a first trajectory process, a second trajectory process, and an input router associated with both the first trajectory process and the second trajectory process; then, calculating the first flight trajectory for the first flight plan can include calculating the first flight trajectory for the first flight plan using the first trajectory process, where calculating the second flight trajectory for the second flight plan can include calculating the second flight trajectory for the second flight plan using the second trajectory process while the first trajectory process is active, and where performing the switch from controlling the aircraft to fly along the first flight trajectory to controlling the aircraft to fly along the second flight trajectory can include: determining that the first trajectory process is inactive using the input router; and determining that the second trajectory process is active using the input router, such as discussed herein in the context at least of FIGS. 3, 4, 5. In some of these examples, the input router can include an input decision engine; then, performing the switch from controlling the aircraft to fly along the first flight trajectory to controlling the aircraft to fly along the second flight trajectory can include: receiving a change indication that indicates a change of a flight plan at the input router; determining to change trajectory processes based on the change indication using the input decision engine; and after determining to change trajectory processes, the input router determining to switch from utilizing the first trajectory process to utilizing the second trajectory process, such as discussed herein in the context of FIGS. 4, 5, and 7. In other of these examples, the change indication can indicate a reason for the change of the flight plan; then, determining to change trajectory processes based on the change indication using the input decision engine can include determining to change trajectory processes based on the reason for the change of the flight plan, such as discussed herein in the context at least of FIG. 7. In other of these examples, the reason for the change of the flight plan can include one or more of: a reason indicating that a flight plan was activated, a reason indicating that a flight plan was deactivated, a reason indicating that a flight plan was executed, a reason indicating that a flight plan was discarded, and a reason indicating that a flight plan was edited, such as discussed herein in the context at least of FIG. 7. In other of these examples, the computing device can further include an output router; then, determining to change trajectory processes based on the change indication using the input decision engine can include: generating one or more tags indicating a change in trajectory processes using the input decision engine; and providing the one or more tags indicating the change in trajectory processes to the output router, such as discussed herein in the context at least of FIG. 6. In other of these examples, providing the one or more tags indicating the change in trajectory processes to the output router can include: providing a first tag of the one or more tags indicating the first flight plan is inactive to the first trajectory process; and providing a second tag of the one or more tags indicating the second flight plan is active to the second trajectory process, such as discussed herein in the context at least of FIG. 6. In other of these examples, method 800 can further include: after the one or more tags indicating the change in trajectory processes to the output router are provided, the output router providing a flight trajectory output of the second trajectory process for controlling the aircraft to a flight management system of the aircraft based on the second flight trajectory, such as discussed herein in the context at least of FIG. 6.

In other examples, performing the switch from controlling the aircraft to fly along the first flight trajectory to controlling the aircraft to fly along the second flight trajectory can include performing the switch from controlling the aircraft to fly along the first flight trajectory to controlling the aircraft to fly along the second flight trajectory without interruption, such as discussed herein in the context at least of FIGS. 3, 4, and 5.

In other examples, performing the switch from controlling the aircraft to fly along the first flight trajectory to controlling the aircraft to fly along the second flight trajectory without interruption can include processing the first flight trajectory and the second flight trajectory in parallel throughout the switch, such as discussed herein in the context at least of FIGS. 3, 4, and 5.

In some examples, the trajectory calculator can further include a third trajectory process; then, method 800 can further include: receiving, at the computing device, one or more third flight-plan-related inputs that relate to a third flight plan that differs from the first flight plan and the second flight plan; calculating a third flight trajectory for the third flight plan using the third trajectory process; and after the third trajectory process has calculated the third flight trajectory, performing a second switch from controlling the aircraft to fly along the second flight trajectory to controlling the aircraft to fly along the third flight trajectory using the computing device for at least: determining that the second trajectory process is inactive using the input router, and determining that the third trajectory process is active using the input router, where the aircraft maintains continuous flight along the second flight trajectory during the second switch, such as discussed herein in the context at least of FIG. 5. In some of these examples, the third flight-plan-related inputs include one or more of: an input to change meteorological condition data, an input to change aircraft weight data, and an input to change aircraft velocity data, such as discussed herein in the context at least of FIG. 7.

The novel features believed characteristic of the illustrative embodiments are set forth in the appended claims. The illustrative embodiments, however, as well as a preferred mode of use, further objectives and descriptions thereof, will best be understood by reference to the present specification when read in conjunction with the accompanying drawings in which some, but not all of the disclosed embodiments may be shown.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in the disclosed flowcharts may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method to control an aircraft, the method comprising:
receiving, at a computing device, one or more first flight-plan-related inputs that comprise a first flight plan to fly from an origin to a destination via one or more waypoints;
calculating a first flight trajectory for the first flight plan using the computing device;
while controlling the aircraft to fly along the first flight trajectory for the first flight plan being in an active state, the computing device:
receiving multiple second flight-plan-related inputs that change the first flight plan to a modified flight plan;
creating copies of the first flight plan;
editing the copies of the first flight plan according to the multiple second flight-plan-related inputs to simultaneously calculate multiple flight trajectories for the modified flight plan, wherein editing the copies of the first flight plan is performed in parallel with providing aircraft controls for the first flight trajectory;
maintaining the multiple flight trajectories for the modified flight plan in pending states; and
after the computing device has calculated the multiple flight trajectories, performing a switch from controlling the aircraft to fly along the first flight trajectory to controlling the aircraft to fly along a selected one of the multiple flight trajectories using the computing device by changing the modified flight plan to an active state causing routing of the selected one of the multiple flight trajectories to an output route associated with the first flight trajectory, wherein the aircraft maintains continuous flight along the output route during the switch.

2. The method of claim 1, wherein the computing device comprises a trajectory calculator having a first trajectory process, multiple second trajectory processes, and an input router associated with both the first trajectory process and the multiple second trajectory processes,
wherein calculating the first flight trajectory for the first flight plan comprises calculating the first flight trajectory for the first flight plan using the first trajectory process,
wherein calculating the multiple flight trajectories for the modified flight plan comprises calculating the multiple flight trajectories for the modified flight plan using the multiple second trajectory processes while the first trajectory process is active, and
wherein performing the switch from controlling the aircraft to fly along the first flight trajectory to controlling the aircraft to fly along the selected one of the multiple flight trajectories comprises:
determining that the first trajectory process is inactive using the input router; and
determining that one of the multiple second trajectory processes is active using the input router.

3. The method of claim 2, wherein the input router comprises an input decision engine, and wherein performing the switch from controlling the aircraft to fly along the first flight trajectory to controlling the aircraft to fly along the selected one of the multiple flight trajectories comprises:
receiving a change indication that indicates a change of a flight plan at the input router;
determining to change trajectory processes based on the change indication using the input decision engine; and
after determining to change trajectory processes, the input router determining to switch from utilizing the first trajectory process to utilizing the one of the multiple second trajectory processes.

4. The method of claim 3, wherein the change indication indicates a reason for the change of the flight plan, and wherein determining to change trajectory processes based on the change indication using the input decision engine comprises determining to change trajectory processes based on the reason for the change of the flight plan.

5. The method of claim 4, wherein the reason for the change of the flight plan comprises one or more of: a reason indicating that the flight plan was activated, a reason indicating that the flight plan was deactivated, a reason indicating that the flight plan was executed, a reason indicating that the flight plan was discarded, and a reason indicating that the flight plan was edited.

6. The method of claim 3, wherein the computing device further comprises an output router, and wherein determining to change trajectory processes based on the change indication using the input decision engine comprises:
generating one or more tags indicating a change in trajectory processes using the input decision engine; and
providing the one or more tags indicating the change in trajectory processes to the output router.

7. The method of claim 6, wherein providing the one or more tags indicating the change in trajectory processes to the output router comprises:
providing a first tag of the one or more tags indicating the first flight plan is inactive to the first trajectory process; and
providing a second tag of the one or more tags indicating the modified flight plan is active to the second trajectory process.

8. The method of claim 7, further comprising:
after the one or more tags indicating the change in trajectory processes to the output router are provided, the output router providing a flight trajectory output of the one of the multiple second trajectory processes for controlling the aircraft to a flight management system of the aircraft based on the selected one of the multiple flight trajectories.

9. The method of claim 2, wherein the trajectory calculator further comprises a third trajectory process, and wherein the method further comprises:
receiving, at the computing device, one or more third flight-plan-related inputs that relate to a third flight plan that differs from the first flight plan and the modified flight plan;
calculating a third flight trajectory for the third flight plan using the third trajectory process; and
after the third trajectory process has calculated the third flight trajectory, performing a second switch from controlling the aircraft to fly along the selected one of the multiple flight trajectories to controlling the aircraft to fly along the third flight trajectory using the computing device for at least:
determining that the one of the multiple second trajectory processes is inactive using the input router, and
determining that the third trajectory process is active using the input router.

10. The method of claim 9, wherein the third flight-plan-related inputs comprise one or more of: an input to change meteorological condition data, an input to change aircraft weight data, and an input to change aircraft velocity data.

11. The method of claim 1, wherein the first flight trajectory comprises a lateral trajectory or a lateral and vertical trajectory.

12. The method of claim 1, wherein performing the switch from controlling the aircraft to fly along the first flight trajectory to controlling the aircraft to fly along the selected one of the multiple flight trajectories comprises performing the switch from controlling the aircraft to fly along the first flight trajectory to controlling the aircraft to fly along the selected one of the multiple flight trajectories without interruption.

13. The method of claim 12, wherein performing the switch from controlling the aircraft to fly along the first flight trajectory to controlling the aircraft to fly along the selected one of the multiple flight trajectories without interruption comprises processing the first flight trajectory and the selected one of the multiple flight trajectories in parallel throughout the switch.

14. A computing device, comprising:
one or more processors; and
one or more non-transitory computer-readable media configured to store at least computer-readable instructions that, when executed by the one or more processors, cause the computing device to perform functions comprising:
receiving one or more first flight-plan-related inputs that comprise a first flight plan to fly an aircraft from an origin to a destination via one or more waypoints;
calculating a first flight trajectory for the first flight plan;
while controlling the aircraft to fly along the first flight trajectory for the first flight plan being in an active state:
receiving multiple second flight-plan-related inputs that change the first flight plan to a modified flight plan;
creating copies of the first flight plan;
editing the copies of the first flight plan according to the multiple second flight-plan-related inputs to simultaneously calculate multiple flight trajectories for the modified flight plan, wherein editing the copies of the first flight plan is performed in parallel with providing aircraft controls for the first flight trajectory;
maintaining the multiple flight trajectories for the modified flight plan in pending states; and
after calculating the multiple flight trajectories, performing a switch from controlling the aircraft to fly along the first flight trajectory to controlling the aircraft to fly along selected one of the multiple flight trajectories by changing the modified flight plan to an active state causing routing of the selected one of the multiple flight trajectories to an output route associated with the first flight trajectory, wherein the aircraft maintains continuous flight along the output route during the switch.

15. The computing device of claim 14, further comprising: a trajectory calculator having a first trajectory process, multiple second trajectory processes, and an input router associated with both the first trajectory process and the multiple second trajectory processes,
wherein calculating the first flight trajectory for the first flight plan comprises calculating the first flight trajectory for the first flight plan using the first trajectory process,
wherein calculating the multiple flight trajectories for the modified flight comprises calculating the multiple flight trajectories for the modified flight plan using the multiple second trajectory processes while the first trajectory process is active, and wherein performing the switch from controlling the aircraft to fly along the first flight trajectory to controlling the aircraft to fly along the selected one of the multiple flight trajectories comprises:
determining that the first trajectory process is inactive using the input router; and
determining that one of the multiple second trajectory processes is active using the input router.

16. The computing device of claim 15, wherein the input router comprises an input decision engine, and wherein performing the switch from controlling the aircraft to fly along the first flight trajectory to controlling the aircraft to fly along the selected one of the multiple flight trajectories comprises:
receiving a change indication that indicates a change of a flight plan at the input router;
determining to change trajectory processes based on the change indication using the input decision engine; and
after determining to change trajectory processes, the input router determining to switch from utilizing the first trajectory process to utilizing the one of the multiple second trajectory processes.

17. The computing device of claim 16, wherein the change indication indicates a reason for the change of the flight plan,
wherein determining to change trajectory processes based on the change indication using the input decision engine comprises determining to change trajectory processes based on the reason for the change of the flight plan, and
wherein the reason for the change of the flight plan comprises one or more of: a reason indicating that the flight plan was activated, a reason indicating that the flight plan was deactivated, a reason indicating that the flight plan was executed, a reason indicating that the flight plan was discarded, and a reason indicating that the flight plan was edited.

18. The computing device of claim 16, further comprising an output router, wherein determining to change trajectory processes based on the change indication using the input decision engine comprises:
generating one or more tags indicating a change in trajectory processes using the input decision engine; and
providing the one or more tags indicating the change in trajectory processes to the output router.

19. The computing device of claim 18, wherein providing the one or more tags indicating the change in trajectory processes to the output router comprises:
providing a first tag of the one or more tags indicating the first flight plan is inactive to the first trajectory process, and
providing a second tag of the one or more tags indicating the modified flight plan is active to the second trajectory process; and
wherein the functions further comprise:
after the one or more tags indicating the change in trajectory processes to the output router are provided, the output router providing a flight trajectory output of the second trajectory process for controlling the aircraft to a flight management system of the aircraft based on the second flight trajectory.

20. A non-transitory computer readable medium having stored thereon computer-readable instructions, that when executed by one or more processors of a computing device associated with an aircraft, cause the computing device to perform functions comprising:

receiving one or more first flight-plan-related inputs that comprise a first flight plan to fly from an origin to a destination via one or more waypoints;

calculating a first flight trajectory for the first flight plan;

while controlling the aircraft to fly along the first flight trajectory for the first flight plan being in an active state:

receiving multiple second flight-plan-related inputs that change the first flight plan to a modified flight plan;

creating copies of the first flight plan;

editing the copies of the first flight plan according to the multiple second flight-plan-related inputs to simultaneously calculate multiple flight trajectories for the modified flight plan, wherein editing the copies of the first flight plan is performed in parallel with providing aircraft controls for the first flight trajectory;

maintaining the multiple flight trajectories for the modified flight plan in pending states; and after calculating the multiple flight trajectories, performing a switch from controlling the aircraft to fly along the first flight trajectory to controlling the aircraft to fly along a selected one of the multiple flight trajectories using the computing device by changing the modified flight plan to an active state causing routing of the selected one of the multiple flight trajectories to an output route associated with the first flight trajectory, wherein the aircraft maintains continuous flight along the output route during the switch.

\* \* \* \* \*